(12) United States Patent
Zhu et al.

(10) Patent No.: US 8,157,577 B2
(45) Date of Patent: Apr. 17, 2012

(54) ELECTRICAL CARD CONNECTOR

(75) Inventors: Fang-Yue Zhu, Kunshan (CN); Li Li, Kunshan (CN); Qi-Jun Zhao, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/959,369

(22) Filed: Dec. 3, 2010

(65) Prior Publication Data

US 2011/0136360 A1    Jun. 9, 2011

(51) Int. Cl.
*H01R 13/62* (2006.01)
(52) U.S. Cl. .................. 439/159; 439/607.01
(58) Field of Classification Search .................. 439/188, 439/157, 159, 160, 607.01, 607.02, 630, 439/946; 200/51.01, 51.02, 51.06
See application file for complete search history.

(56) References Cited

U.S. PATENT DOCUMENTS

| | | | | |
|---|---|---|---|---|
| 6,572,392 B2 * | 6/2003 | Motojima | ...................... | 439/159 |
| 7,195,501 B2 * | 3/2007 | Zhao | .............................. | 439/159 |
| 7,311,537 B2 * | 12/2007 | Hsu | .............................. | 439/188 |
| 7,341,466 B1 * | 3/2008 | Kondo | .......................... | 439/159 |
| 2009/0246993 A1 | 10/2009 | Yu et al. | | |

\* cited by examiner

*Primary Examiner* — Thanh Tam Le
(74) *Attorney, Agent, or Firm* — Wei Te Chung; Andrew C. Cheng; Ming Chieh Chang

(57) ABSTRACT

An electrical card connector (100) includes a receiving space (10) for receiving an electrical card, and includes an insulative housing (1) and an ejecting mechanism (4) retained in the insulative housing (1). The ejecting mechanism (4) includes a movable slider (41), a coiled spring (42) urging the slider forwardly and a link rod (43) for controlling the slider to be positioned at a first position or a second position. The slider (41) includes a heart-shape groove (414) for guiding and limiting a movement of the slider (41) and a bulge (417) located at front of the heart-shape groove (414). The bulge (417) defines a second inclined plane (4171), the second inclined plane (4171) faces the heart-shape groove (414) for facilitating inclining movement of the link rod (43).

9 Claims, 5 Drawing Sheets

ELECTRICAL CARD CONNECTOR

BACKGROUND OF THE INVENTION

1. Field of the Invention

The present invention relates to an electrical card connector for preventing an electrical card from being locked in the electrical card connector by mistake.

2. Description of Related Art

Usually, electrical device such as digital camera and PDA deploys an electrical card for increasing the storage of the device. An electrical card connector is used for connecting the electrical card to the electrical device. Electrical card connector in early stage just comprises an insulative housing, a plurality of terminals retained in the insulative housing for contacting with an electrical card, and a metal shell covering the insulative housing. A part of the electrical card exposes to the outside of the electrical card connector for ejecting itself conveniently. Indeed, some electrical card connectors further include a push-push type ejecting mechanism for pushing the electrical card into or out of the electrical card connectors. The ejecting mechanism includes a slider moveable in the insulative housing, a coiled spring abutting against the slider, a link rod for controlling positions of the slider, and a locking spring for holding the electrical card in the electrical card connector and avoiding the electrical card from drawing out of the electrical card connector by mistake. The slider has a heart-shape groove, a heart-shape block and a bulge located in front of the heart-shape block. The heart-shape block and the bulge define the heart-shape groove together.

While the electrical card is withdrawed from the electrical card connector, the link rod may move aslant easily, so the link rod may catch the bulge and can not move again. So the slider will be stopped in a mistake position. Thus the electrical card would be locked in the electrical card connector.

Hence, an improved electrical card connector is desired to overcome the above problems.

BRIEF SUMMARY OF THE INVENTION

According to one aspect of the present invention, an electrical card connector, comprises an insulative housing, a plurality of contacts retained in the insulative housing for mating with the electrical card and an ejecting mechanism disposed in the insulative housing. The insulative housing defines a front mating face and a receiving space extending backwardly from the mating face for receiving an electrical card. The ejecting mechanism includes a movable slider, a coiled spring urging the slider forwardly and a link rod for controlling the slider to be positioned at a first position or a second position farther away from the mating face than the first position. The slider includes a heart-shape groove for guiding and limiting movement of the slider and a bulge located at front of the heart-shape groove. The bulge defines a second inclined plane, the second inclined plane faces the heart-shape groove for facilitating inclining movement of the link rod.

According to another aspect of the present invention, an electrical card connector, comprises an insulative housing, a plurality of contacts received in the insulative housing for engaging with the electrical card, a metal shell covering the insulative housing and an ejecting mechanism disposed in the insulative housing. The insulative housing defines a front mating face and a receiving space extending backwardly from the mating face for receiving an electrical card. The ejecting mechanism includes a movable slider, a coiled spring urging the slider forwardly and a link rod for controlling the slider to be positioned at a first position or a second position farther away from the mating face than the first position. The slider includes a heart-shape groove for guiding and limiting movement of the slider and a heart-shape block in middle of the heart-shape groove. The heart-shape block defines a first inclined plane, the first inclined plane faces the heart-shape groove for facilitating inclining movement of the link rod.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
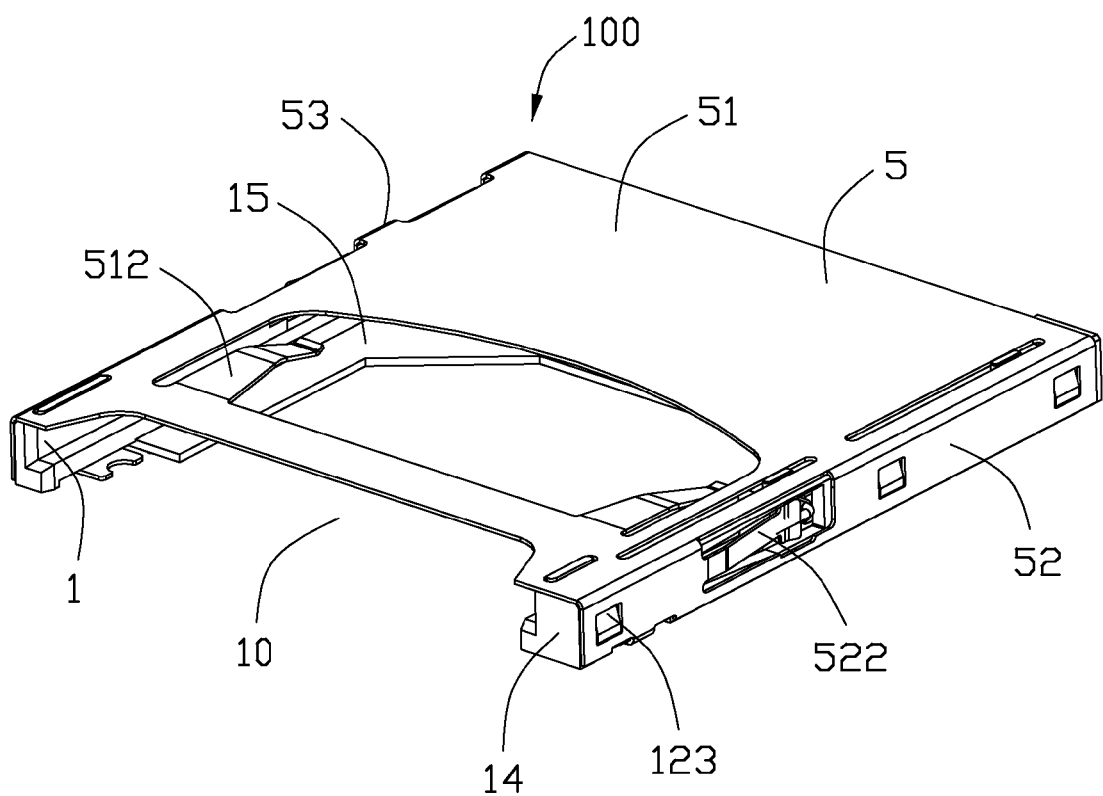
FIG. 1 is a perspective view of an electrical card connector.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-5, an electrical card connector 100 for receiving an electrical card (not shown), comprises an insulative housing 1, a plurality of contacts 2 retained in the insulative housing 1, a switch 3 installed on one side of the insulative housing 1, a push-push type ejecting mechanism 4 fixed in the insulative housing 1, a metal shell 5 covering the insulative housing 1 and a spring portion 6 retained on the ejecting mechanism 4 for locking the electrical card.

Figure 3:
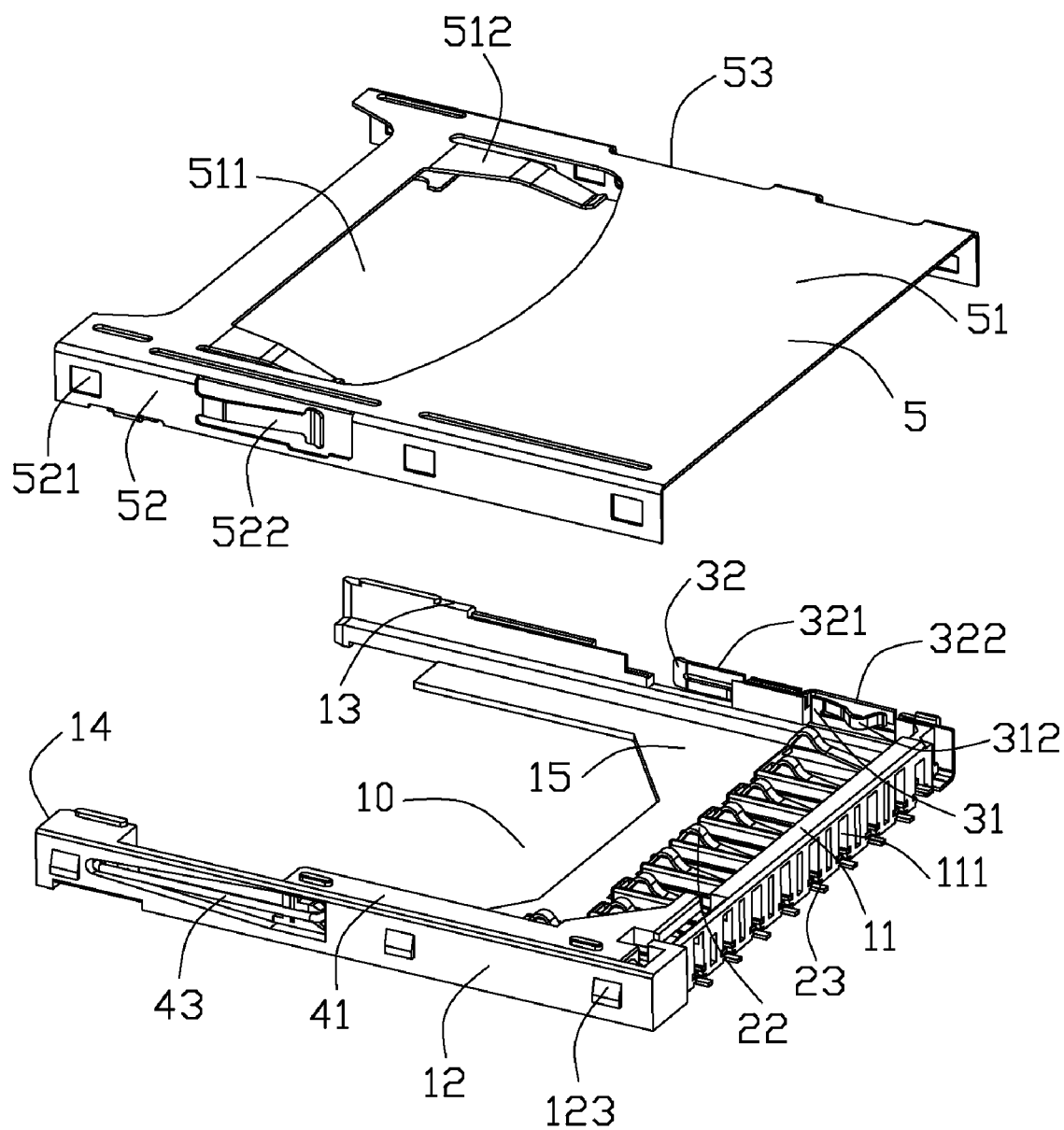
FIG. 3 is a partly exploded view of the electrical card connector shown in FIG. 1.
Figure 4:
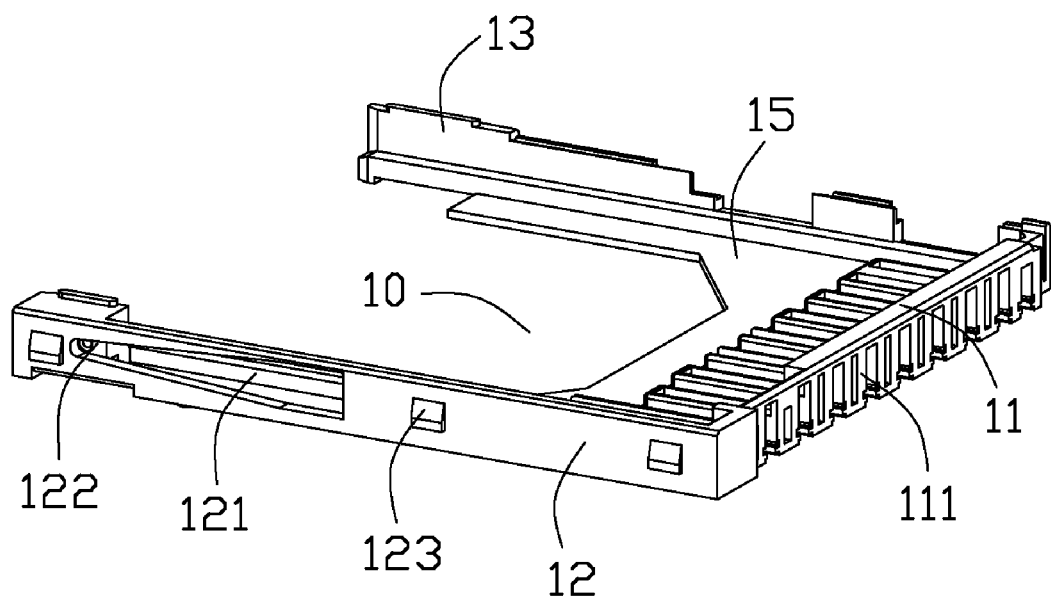
FIG. 4 is a perspective view of an insulative housing of the electrical card connector shown in FIG. 2.

Referring to FIGS. 3-4, the insulative housing 1 has a rear wall 11, a bottom wall 15, a front mating face 14, a receiving space 10 extending backwardly from the front mating face 14 along a front to rear direction for receiving the electrical card and two opposite side walls extending upwardly from two lateral sides of the bottom wall 15. The side walls include a first side wall 12 and a second side wall 13. The rear wall 11 defines a plurality of passageways 111 to retain the contacts 2. The first side wall 12 defines an assembly cavity 121 and an assembly hole 122. The assembly hole 122 is recessed inwardly from an outer sidewall of the first side wall 12. The assembly hole 122 does not run through the first side wall 12 along a left to right direction. The first and second side walls 12, 13 define a plurality of protuberances 123 for engaging with the metal shell 5.

Figure 2:
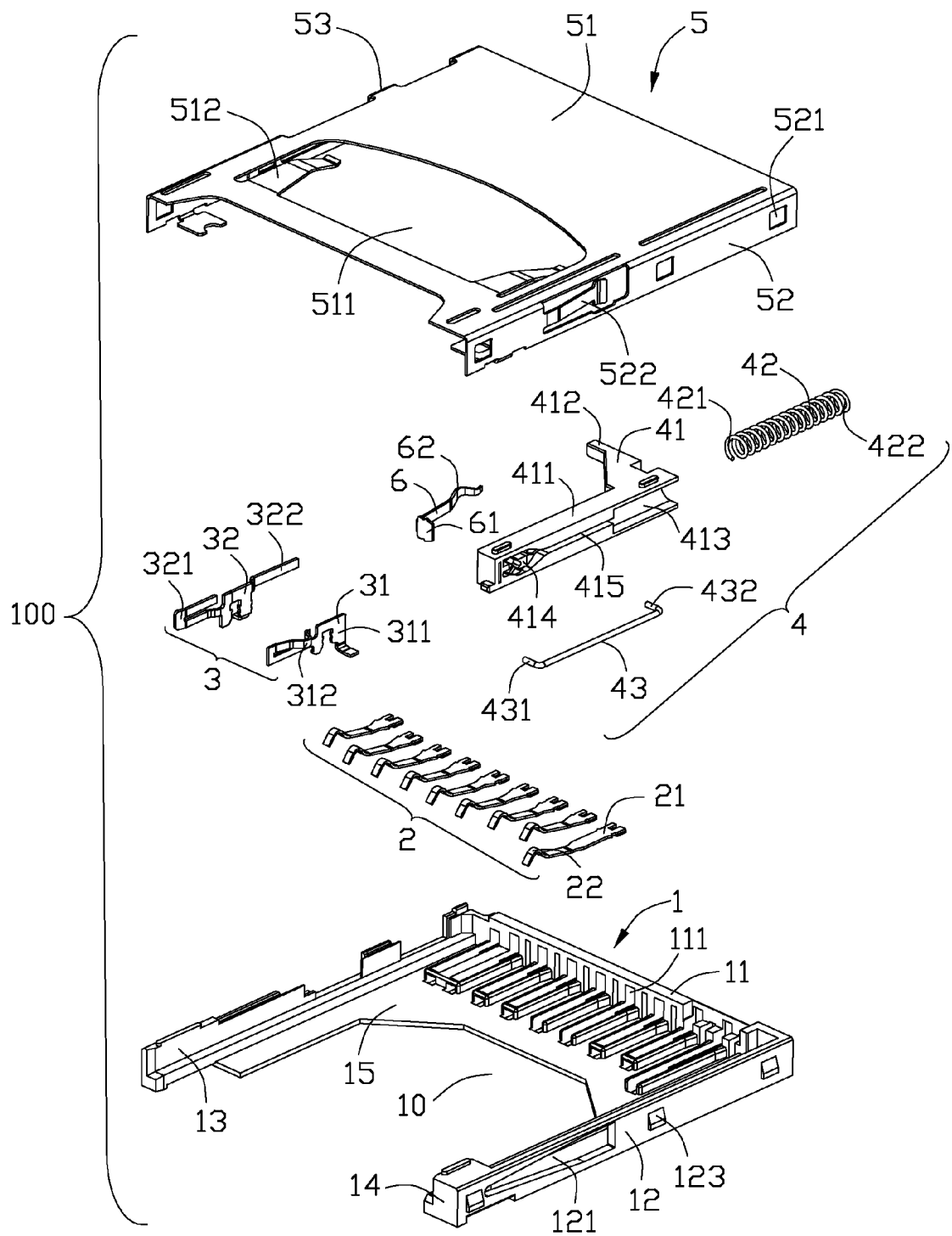
FIG. 2 is an exploded view of the electrical card connector shown in FIG. 1.

Referring to FIGS. 2-3, the contacts 2 are retained in the insulative housing 1 for mating with the electrical card. The contacts 2 are arranged on the insulative housing 1 along a transverse direction. Each contact 2 includes a securing portion 21 retained in the passageways 111, a contacting portion 22 protruding from the securing portion 21 into the receiving space 10 for connecting with the electrical card and a soldering portion 23 extending from the securing portion 21 out of the insulative housing 1.

Referring to FIG. 2, the switch 3 is installed on the second side wall 13. The switch 3 includes a first switch 31 and a second switch 32 which can abut against the first switch 31. The second switch 32 is positioned at a position farther away from the receiving space 10 than the first switch 31 along the left to right direction. The first switch 31 defines a first fixing portion 311 retained in the second side wall 13 and a first engaging portion 312 extending forwardly from the first fixing portion 311. The second switch 32 defines a second fixing portion 321 retained in the second side wall 13 and a second engaging portion 322 extending backwardly from the second fixing portion 321. The first engaging portion 312 can be distorted outwardly and engage with the second engaging portion 322 when the electrical card is inserted into the receiving space 10.

The push-push type ejecting mechanism 4 is disposed on the bottom wall 15 of the insulative housing 1. The ejecting mechanism 4 comprises a slider 41 moveably received in the insulative housing 1, a coiled spring 42 having a front end for engaging with the slider 41 and a rear end for abutting against the insulative housing 1 and a link rod 43 for controlling positions of the slider 41. The coiled spring 42 can urge the slider 41 forwardly. The spring portion 6 is secured in the slider 41. The link rod 43 is used for controlling the slider 41 to be positioned at a first position or a second position farther away from the front mating face 14 than the first position. The first position is a start position of the slider 41 before the electrical card being inserted into the electrical card connector 100. The second position is a last position of the slider 41 with the contacts 2 electrically connecting with the electrical card.

Figure 5:
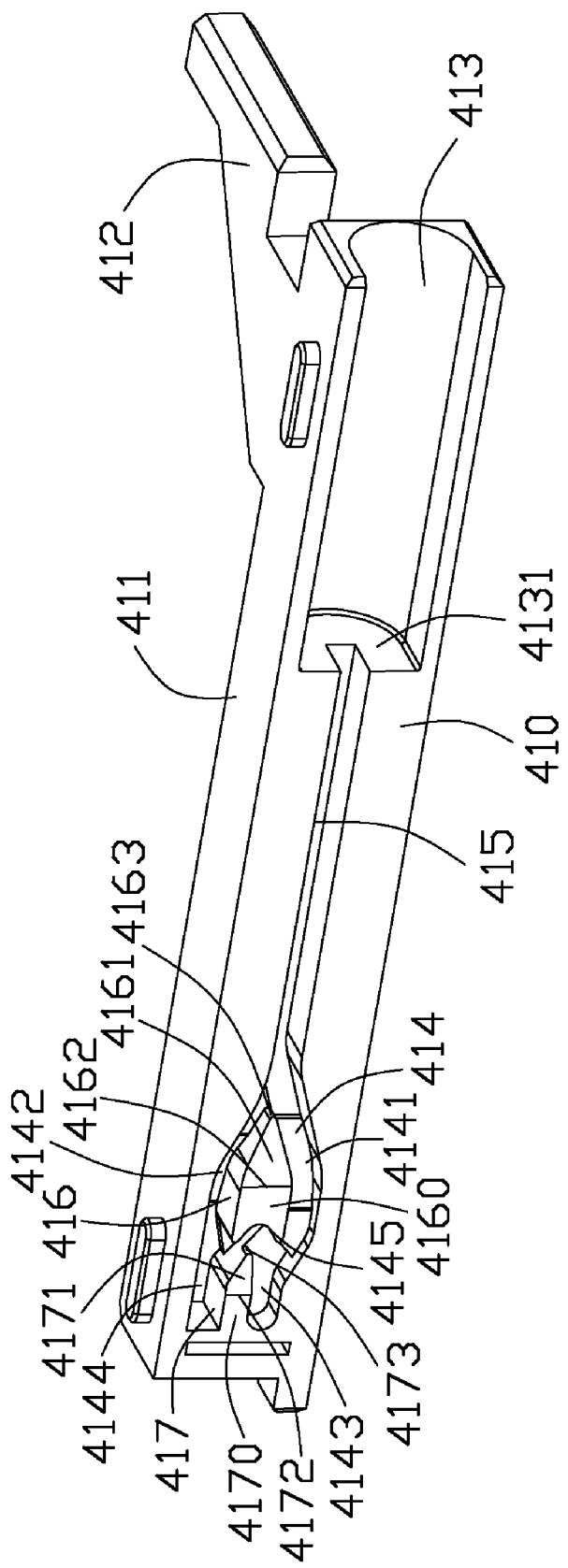
FIG. 5 is a perspective view of a slider of the electrical connector shown in FIG. 2.

The slider 41 includes a main portion 411 extending along the front to rear direction and a protrusion 412 extending from a rear end of the main portion 411 into the receiving space 10 for abutting against a front end of the electrical card. The main portion 411 and the protrusion 412 form an L-shape frame approximately together. Referring to FIG. 5, the main portion 411 includes an outer surface 410, a semicircular slot 413 for receiving and abutting against the coiled spring 42, a heart-shape groove 414 for guiding and limiting a movement of the slider 413, a straight guiding groove 415 located between the semicircular slot 413 and the heart-shape groove 414 and a bulge 417 located at a front of the heart-shape groove 414. The straight guiding groove 415 is located in a rear of the heart-shape groove 414 and in connection with the semicircular slot 413 and the heart-shape groove 414. The semicircular slot 413 is located in a rear portion of the slider 41. The heart-shape groove 414 is located in a front portion of the slider 41. The semicircular slot 413 has an engaging face 4131 for abutting against the coiled spring 42 along the front to rear direction.

The heart-shape groove 414 is recessed from the outer surface 410 and extends along the left to right direction. A heart-shape block 416 is located in the middle of the heart-shape groove 414. The heart-shape block 416 presents an arc-shape frame in a front end thereof. The heart-shape groove 414 has a first slot 4141, a second slot 4143, a third slot 4142, a fourth slot 4144 and a locking slot 4145. The first and second slots 4141, 4143 connect with each other and are located in a lower side of the slider 41 for guiding the link rod 43 to insert. The third and fourth slots 4142, 4144 connect with each other and are located in an upper side of the slider 41 for guiding the link rod 43 to withdraw. The first, second, third and fourth slots 4141, 4142, 4143, 4144 and the locking slot 4145 connect with each other and form the heart-shape groove 414. The first and third slots 4141, 4143 are located at two sides of the heart-shape block 416. The second and fourth slots 4142, 4144 are located at two sides of the bulge 417. The first slot 4141 is longer than the third slot 4143 along the front to rear direction. The second slot 4142 is longer than the fourth slot 4144 along the front to rear direction.

The heart-shape block 416 defines a first plane 4160 located in a front thereof and a first inclined plane 4161 aslant extending backwardly and inwardly from the first plane 4160. The first inclined plane 4161 has a first front portion 4162 and a first rear portion 4163. The first front portion 4162 is located at an outer side compared with the first rear portion 4163. The first inclined plane 4161 and straight guiding groove 415 are arranged face to face. The first inclined plane 4161 is located in front of the straight guiding groove 415 and is adjacent to the straight guiding groove 415. Under this condition, the link rod 43 will not catch a rear end of the heart-shape block 416 when the link rod 43 moves tipsily, it will make the link rod 43 move normally in the heart-shape groove 414, so the electrical card can be inserted into the receiving space 10 steadily.

The bulge 417 defines a second plane 4170 in front and a second inclined plane 4171 aslant extending backwardly and inwardly from a rear end of the second plane 4170. The second inclined plane 4171 faces the heart-shape groove 414 for facilitating inclining movement of the link rod 43. The second plane 4170 is coplanar with the outer sidewall of the slider 41. The second inclined plane 4171 is located in front of the locking slot 4145 and is adjacent to the heart-shape block 416. The second inclined plane 4171 defines a second front portion 4172 and a second rear portion 4173, the second front portion 4172 is located at an outer side compared with the second rear portion 4173. Under this condition, the link rod 43 will not catch a rear end of the bulge 417 when the link rod 43 moves tipsily, the link rod 43 moves normally in the heart-shape groove 414, so the electrical card can withdraw from the receiving space 10 steadily.

Referring to FIGS. 2-3, the coiled spring 42 includes a first portion 421 located in front and a second portion 422 located in the wings. The first portion 421 is disposed on the semicircular slot 413 of the slider 41 and abuts against the engaging face 4131. The second portion 422 engages with a rear end of the insulative housing 1.

The link rod 43 includes a first part 431 located in front and a second part 432 located in the wings. The first part 431 is installed in the assembly hole 122 of the insulative housing 1. The second part 432 can move in the heart-shape groove 414 by the electrical card inserting into the receiving space 10.

The metal shell 5 is made of a piece of metal sheet, and comprises a top wall 51, a first side portion 52 and a second side portion 53. The first and second side portions 52, 53 bend downwardly from two lateral sides of the top wall 51. The top wall 51 has an opening 511 and a pair of first flexible plates 512 extending backwardly into the opening 511 for increasing inserting and extraction force of the electrical card. The first and second side portions 52, 53 include a plurality of through holes 521 for engaging with the protuberance 123 of the insulative housing 1. The first side portion 52 has a second flexible plate 522 engaged with the link rod 43 for preventing the link rod 43 from coming out of the slider 41.

The spring portion 6 is secured in the slider 41. The spring portion 6 includes a retaining portion 61 and a locking portion 62 extending backwardly from the retaining portion 61 for locking the electrical card. The electrical card has a cutout for receiving the locking portion 62.

Referring to FIG. 5, the slider 41 is located at the first position before the electrical card inserted into the receiving space 10. When the electrical card is inserted into the receiving space 10 normally, one side of the electrical card resists the locking portion 62 outwardly, then when the electrical card continue moving, the locking portion 62 will lock into a cutout of the electrical card. The front end of the electrical card pushes the slider 41 moving backwardly along the electrical card insertion direction. The link rod 43 moves in the heart-shape groove 414. When the link rod 43 moves tipsily, the link rod 43 will not catch the rear end of the heart-shape block 416 and get across the heart-shape block 416 because of the first inclined plane 4161. So the electrical card can be inserted into the receiving space 10 steadily. When the electrical card is pushed backwardly to the second position, the contacts 2 electrically connect with the electrical card. The first flexible plates 512 are above the electrical card for optimizing inserting and extraction force of the electrical card. The second flexible plate 522 is located at an outer position than the link rod 43 for preventing the link rod 43 from running outwardly over the heart-shape groove 414.

Referring to FIG. 5, during withdrawing the electrical card, an operator would push the electrical card backwardly, the electrical card is ejected by the ejecting mechanism 4, the slider 41 drives the electrical card move fast from the second position to the first position togetherly. When the link rod 43 moves tipsily, the link rod 43 will not catch the rear end of the bulge 417 because of the second inclined plane 4171. So the electrical card can withdraw from the receiving space 10 steadily.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. An electrical card connector, comprising:
    an insulative housing defining a front mating face and a receiving space extending backwardly from the mating face for receiving an electrical card;
    a plurality of contacts retained in the insulative housing for mating with the electrical card; and
    an ejecting mechanism disposed in the insulative housing, the ejecting mechanism including a movable slider, a coiled spring urging the slider forwardly and a link rod for controlling the slider to be positioned at a first position and a second position farther away from the mating face than the first position, the slider including a heart-shape groove for guiding and limiting movement of the slider and a bulge located at front of the heart-shape groove;
        wherein the bulge defines one inclined plane, and said inclined plane faces the heart-shape groove for facilitating inclining movement of the link rod;
    wherein the slider includes a heart-shape block in a middle thereof, the heart-shape block defines another plane and another inclined plane aslant extending backwardly and inwardly from a rear end of the another plane;
    wherein the heart-shape groove has a first and second slots for guiding the link rod to insert, a third and fourth slots for guiding the link rod to withdraw and a locking slot, wherein the first, second, third and fourth slots and the locking slot connect with each other and form the heart-shape groove; and
    wherein the first and third slots are located at two sides of the heart-shape block, the second and fourth slots are located at two sides of the bulge.

2. The electrical card connector as claimed in claim 1, wherein the heart-shape groove is recessed from an outer sidewall of the slider, the bulge defines a plane in a front thereof, the plane is coplanar with the outer sidewall of the slider, the inclined plane aslant extends backwardly and inwardly from a rear end of the plane.

3. The electrical card connector as claimed in claim 1, wherein the inclined plane defines a second front portion and a second rear portion, the second front portion is located at an outer side compared with the second rear portion.

4. The electrical card connector as claimed in claim 1, wherein said another inclined plane has a first front portion and a first rear portion, the first front portion is located at an outer side compared with the first rear portion.

5. The electrical card connector as claimed in claim 1, wherein the slider includes a straight guiding groove located in a rear thereof, said another inclined plane is located in a front of the straight guiding groove and is adjacent to the straight guiding groove.

6. The electrical card connector as claimed in claim 1, wherein said inclined plane is located in a front of the locking slot and is adjacent to the heart-shape block.

7. An electrical card connector, comprising:
    an insulative housing defining a front mating face and a receiving space extending backwardly from the mating face for receiving an electrical card;
    a plurality of contacts received in the insulative housing for engaging with the electrical card;
    a metal shell covering the insulative housing; and
    an ejecting mechanism disposed in the insulative housing, the ejecting mechanism including a movable slider, a coiled spring urging the slider forwardly and a link rod for controlling the slider to be positioned at a first position and a second position farther away from the mating face than the first position, the slider including a heart-shape groove for guiding and limiting a movement of the slider and a heart-shape block in the middle of the heart-shape groove;
    wherein the heart-shape block defines a first inclined plane, the first inclined plane faces the heart-shape groove for facilitating inclining movement of the link rod;
    wherein the heart-shape block defines a first plane, the first inclined plane aslant extends backwardly and inwardly from the first plane; and
    wherein the heart-shape groove is recessed from an outer sidewall of the slider, the slider includes a bulge located at front of the heart-shape groove, the bulge defines a second plane and a second inclined plane, wherein the second plane is coplanar with the outer sidewall of the slider and the second inclined plane aslant extending backwardly and inwardly from a rear end of the second plane.

8. The electrical card connector as claimed in claim 7, wherein the first inclined plane has a first front portion and a first rear portion, the first front portion is located at an outer side compared with the first rear portion.

9. The electrical card connector as claimed in claim 7, wherein the second inclined plane defines a second front portion and a second rear portion, the second front portion is located at an outer side compared with the second rear portion.

* * * * *